United States Patent [19]
Bakhshi et al.

[11] Patent Number: 5,736,475
[45] Date of Patent: Apr. 7, 1998

[54] MINERAL FIBER PRODUCT CONTAINING POLYMERIC MATERIAL

[75] Inventors: Shiv K. Bakhshi, Columbus; Steven H. Williams, Alexandria; James W. Scott, Newark; Randall M. Haines, Frazeysburg; Ralph D. McGrath, Granville, all of Ohio

[73] Assignee: Owens Corning Fiberglas Technology, Inc., Summit, Ill.

[21] Appl. No.: 835,277

[22] Filed: Apr. 9, 1997

(Under 37 CFR 1.47)

Related U.S. Application Data

[60] Continuation of Ser. No. 481,029, Jun. 7, 1995, abandoned, which is a division of Ser. No. 79,413, Jun. 21, 1993, Pat. No. 5,490,961.

[51] Int. Cl.$^6$ .............................. C03B 37/02; C03B 37/04
[52] U.S. Cl. .......................... 442/415; 442/417; 156/296; 156/62.2; 264/8; 264/122
[58] Field of Search ................... 156/62.2, 62.4, 156/295; 264/122, 123, 8; 428/283, 288, 296; 442/415, 417

[56] References Cited

U.S. PATENT DOCUMENTS

| | | |
|---|---|---|
| 2,278,895 | 4/1942 | Bugeley et al. . |
| 2,399,260 | 4/1946 | Taylor . |
| 2,433,000 | 12/1947 | Manning . |
| 2,731,066 | 1/1956 | Hogenhobler et al. . |
| 2,778,763 | 1/1957 | Novak . |
| 2,944,284 | 7/1960 | Tillotson . |
| 3,012,281 | 12/1961 | Stalego . |
| 3,016,599 | 1/1962 | Perry, Jr. . |
| 3,022,538 | 2/1962 | Setterberg . |
| 3,025,202 | 3/1962 | Morgan et al. . |
| 3,050,427 | 8/1962 | Slayter et al. . |
| 3,077,751 | 2/1963 | Snow et al. . |
| 3,134,704 | 5/1964 | Modigliani . |
| 3,264,389 | 8/1966 | Sims . |
| 3,511,747 | 5/1970 | Davies . |
| 3,684,415 | 8/1972 | Buntin et al. . |
| 3,725,518 | 4/1973 | Gaffney . |
| 3,765,998 | 10/1973 | Oswald et al. . |
| 3,862,287 | 1/1975 | Davis . |
| 3,877,911 | 4/1975 | Borst . |
| 4,147,574 | 4/1979 | Setsuie et al. . |
| 4,197,063 | 4/1980 | Davidson . |
| 4,224,373 | 9/1980 | Marzocchi . |
| 4,277,436 | 7/1981 | Shah et al. . |
| 4,359,444 | 11/1982 | Shah et al. . |
| 4,414,276 | 11/1983 | Kiriyama et al. . |
| 4,552,603 | 11/1985 | Harris, Jr. et al. . |
| 4,568,506 | 2/1986 | Kiriyama et al. . |
| 4,568,581 | 2/1986 | Peoples, Jr. ........................ 264/122 |
| 4,871,491 | 10/1989 | McMahon et al. . |
| 4,888,235 | 12/1989 | Chenoweth et al. .................. 428/283 |
| 5,011,523 | 4/1991 | Roncato et al. . |
| 5,057,168 | 10/1991 | Muncrief . |
| 5,100,435 | 3/1992 | Onwumere . |
| 5,100,592 | 3/1992 | Sparks et al. . |
| 5,123,949 | 6/1992 | Thiessen . |
| 5,232,638 | 8/1993 | Theissen et al. . |
| 5,290,449 | 3/1994 | Heagle et al. ...................... 428/283 X |

FOREIGN PATENT DOCUMENTS

| | | |
|---|---|---|
| 0371613 | 6/1990 | European Pat. Off. . |
| 0530843 | 3/1993 | European Pat. Off. . |
| 0329118 | 8/1993 | European Pat. Off. . |

*Primary Examiner*—Michael W. Ball
*Assistant Examiner*—Sam Shuan Yao
*Attorney, Agent, or Firm*—C. Michael Gegenheimer; Curtis B. Brueske

[57] ABSTRACT

A method for manufacturing a mineral fiber product includes establishing a stream of mineral fibers, directing polymeric fibers toward the stream of mineral fibers to cause intermingling of the polymeric material, and applying heat to the polymer fibers so that some of them become softened to the extent that they lose their fibrous form and become attached to the mineral fibers as non-fibrous particles, whereas some of the polymer fibers retain their fibrous form.

12 Claims, 2 Drawing Sheets

MINERAL FIBER PRODUCT CONTAINING POLYMERIC MATERIAL

CROSS-REFERENCE TO RELATED APPLICATION(S)

This is a continuation of U.S. patent application Ser. No. 08/481,029, filed Jun. 7, 1995, now abandoned, which is a divisional application of Ser. No. 08/079,413, filed Jun. 21, 1993 now U.S. Pat. No. 5,490,961.

TECHNICAL FIELD

This invention relates to the production of mineral fiber products and, in particular, mineral fiber products having an organic or polymer applied thereto. More particularly, this invention relates to making a mineral fiber product with a novel way of applying polymeric material to the mineral fibers.

BACKGROUND OF THE INVENTION

Mineral fiber products, particularly products made of glass fibers, are typically made as either continuous fibers or discontinuous fibers. Various organic coatings are applied to these fibers for protecting the fibers from abrasion, for connecting the mineral fibers to each other to form a structural product, and for providing compatibility of the mineral fibers with other materials, such as the compatibility between the reinforcement fiber and a plastic matrix. In the case of insulation products, the mineral fibers are bonded together by organic material, such as a phenol/formaldehyde binder, to form a spring-like matrix which can recover after compression during packaging.

The application of organic material to the mineral fibers can take several forms. Continuous mineral fibers can be run through a bath or across a coater to apply a coating to the fibers, such as during the application of a size to continuous fibers. Also, the organic material can be sprayed onto the mineral fibers. This method is commonly used in the manufacture of insulation products where a cylindrical veil of mineral fibers is met with the sprays of the phenol/formaldehyde binder. Typically, the phenol/formaldehyde binder contains urea, and has a molecular weight of around 600 in the uncured state in the aqueous solution being applied to the glass fibers.

One of the problems with applying aqueous organic binders of the prior art to cylindrical veils of mineral fibers is that a portion of the binder tends to evaporate prior to contact between the liquid binder drop and a mineral fiber in the veil. The evaporated binder material becomes a contaminant in the exhaust air stream of the process and must be cleaned up in order to avoid pollution problems. Also, the binder material on the mineral fibers tends to be sticky, requiring extensive cleaning of the fiber collection apparatus to prevent the build-up of clumps of glass fiber insulation material which can drop into the product and cause a product defect.

Another problem associated with the application of binder to insulation products is that the low molecular weight phenol/formaldehyde binder material does not have some of the desirable characteristics of other, higher molecular weight polymeric material, such as polyethylene terephthalate (PET), polypropylene or polyphenylene sulfide (PPS). A primary problem with the low molecular weight binder material is that a curing process is required, and this usually has operating penalties such as the capital and operating cost of a curing oven, the cost of handling pollution problems, degree of cure problems and product integrity problems. If higher molecular weight polymers could be applied to mineral fibers to produce insulation products, some improved features could be realized.

Heretofore, attempts to apply higher molecular weight binders to mineral fibers to produce an insulation product have not met with great success. One of the problems with the attempts to apply higher molecular weight polymers, as well as the lower molecular weight phenol/formaldehyde binders to veils of glass fibers, has been that the application of the material is very uneven, resulting in differences in the amount of the binder material applied to different portions of the insulation product. It would be advantageous to be able to apply these binder materials in a more uniform manner to produce a more uniformly distributed bindered product.

SUMMARY OF THE INVENTION

There is now been developed a method for manufacturing a mineral fiber product which includes the step of directing fibers of polymeric material toward a stream of mineral fibers into entanglement with the mineral fibers and applying heat to the polymer fibers so that some of them become softened to the extent that they lose their fibrous form and become attached to the mineral fibers as nonfibrous particles. A portion of the mineral fibers retain their fibrous form. The method of the invention enables the application of binder materials having molecular weight in excess of 1,000, preferably in excess of 10,000, and most preferably in excess of 100,000.

According to this invention there is provided a method for manufacturing a mineral fiber product comprising: establishing a stream of mineral fibers, directing fibers of polymeric material toward the stream of mineral fibers to cause intermingling of the polymeric material and the mineral fibers, applying heat to the polymer fibers so that some of them become softened to the extent that they lose their fibrous form and become attached to the mineral fibers as polymeric, non-fibrous particles, whereas some of the polymer fibers retain their fibrous form; and collecting the intermingled mineral fibers having polymeric, non-fibrous particles attached thereto and polymeric fibers to form a mineral fiber product. It has been found that the product made by the method of this invention produces an insulation product having a greater degree of flexibility and handleability than typical insulation products. Further, the product produced by the invention exhibits improved recovery over standard insulation products.

One of the advantages of the invention is that it enables the application of high molecular weight thermoplastic binders. Heretofore, these binders have not been able to be successfully applied from outside the veil because of temperature restrictions.

In a specific embodiment of the invention, the stream of mineral fibers contains hot gases which soften a portion of the polymer fibers so that they lose their fibrous form and become attached to the polymer fibers as polymeric, non-fibrous particles. In a more specific embodiment of the invention, the polymeric fibers are directed toward the stream of mineral fibers from a position within a cylindrical veil of fibers to cause intermingling of the polymeric material and the mineral fibers.

In yet another embodiment of the invention, the mineral fibers are centrifuged from a spinner, and after fiberization the fibers are heated and turned downwardly to form a downwardly moving veil of mineral fibers and hot gases. The heat of the hot gases causes some of the polymer fibers coming into contact with the veil to become softened to the extent that they lose their fibrous form and become attached to the mineral fibers.

According to this invention, there is also provided a mineral fiber product made by the process of the invention. This mineral fiber product comprises polymeric fibers intermingled with mineral fibers, where some of the mineral fibers have polymeric, non-fibrous particles attached thereto.

In yet another specific embodiment of the invention, the mineral fiber product comprises about 5 to about 40 percent by weight polymeric material.

DESCRIPTION OF THE INVENTION

The invention will be described in terms of a glass fiber forming operation, although it is to be understood that the invention can be practiced using other heat softenable mineral material, such as rock, slag, and basalt.

Figure 1:
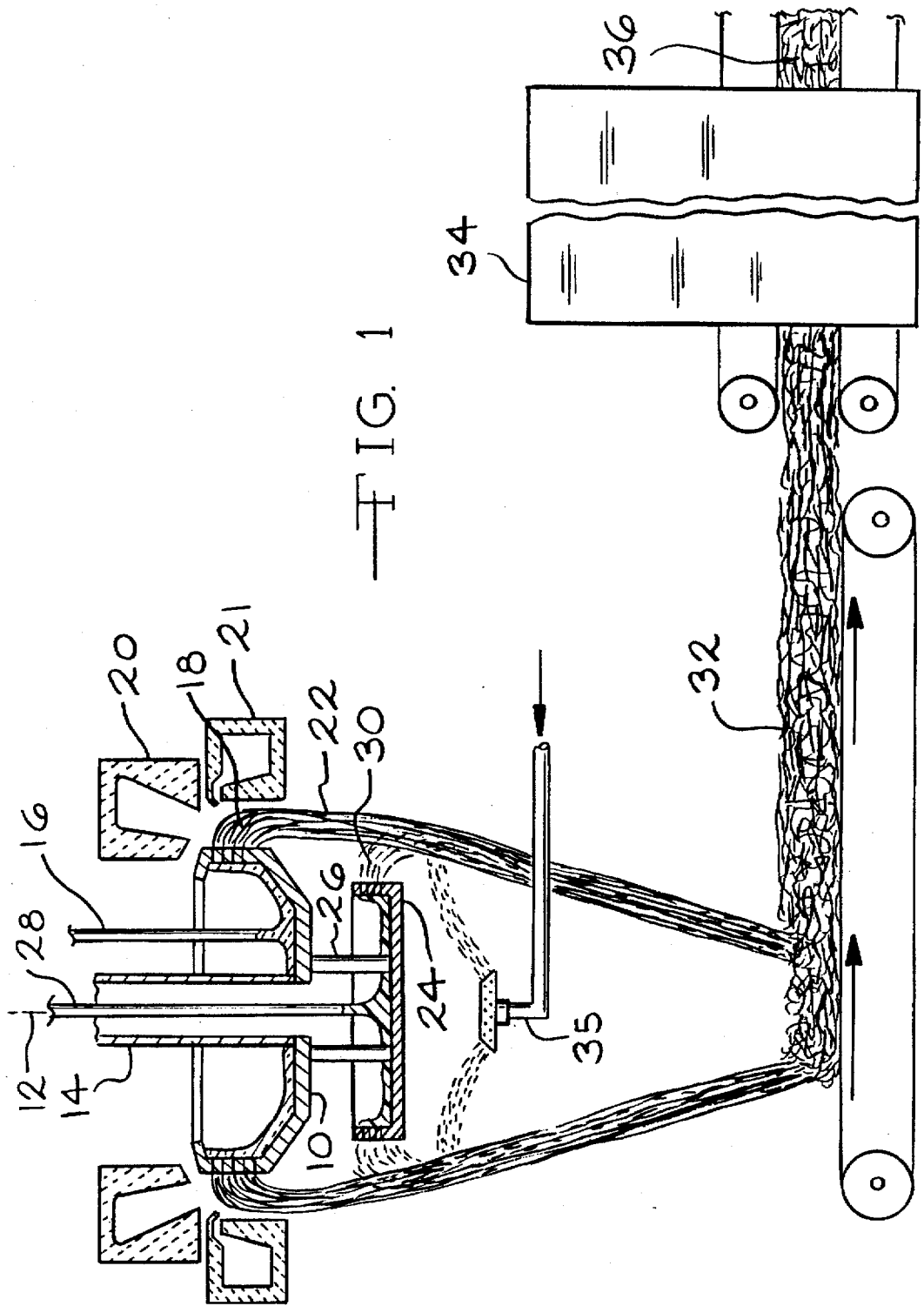
FIG. 1 is a schematic view in elevation of apparatus for carrying out the method of the invention as applied to the centrifical fiberization of glass fibers.

As shown in FIG. 1, glass spinner 10 rotates on axis of rotation 12 and is driven by shaft 14. The spinner is supplied by molten stream of glass 16 which is centrifuged through the walls of the spinner of form glass fibers 18. The glass fibers are maintained in a soft, attenuable state immediately outside the spinner by the heat from annular burner 20. The radially-traveling glass fibers are turned down by blower 21 into a cylindrically shaped veil 22 of fibers, traveling downwardly, i.e., in the direction of the axis of the spinner. The process for creating the downwardly moving cylindrical veil of glass fibers is well known in the art.

It is to be understood that the mineral fibers can be established by other means, such as through a spintex or wheel throwing process, or such as an air blown process. In any event, polymeric fibers are directed toward the stream of mineral fibers to cause an intermingling.

Positioned beneath the glass spinner is a rotatable device for distributing polymeric fibers into contact with the veil from a position within the veil. The embodiment shown in FIG. 1 includes the use of a second spinner, polymer spinner 24, for distributing polymeric material into contact with the veil. The polymer spinner can be mounted for rotation in any form. As shown, it can be mounted with supports 26 into direct contact with the glass spinner for rotation.

The polymer spinner is supplied with stream 28 of molten polymer material. As shown, this stream can be fed through the hollow portion of the glass spinner shaft. The molten polymer can be produced or supplied by using extruder equipment commonly known to those in the art of polymeric materials, such as PET.

Depending on the viscosities, surface tension and other parameters of the polymeric material, and on the rotation rate and orifice sizes of the polymer spinner, polymer fibers 30 may be produced from the polymer spinner. The polymer fibers travel radially outwardly where they meet and intermingle with the mineral fibers.

Since the glass fibers and glass spinners operate at a temperature of around 1,700° F., the polymer fibers are rapidly thrust into a region of high temperature, causing the polymer fibers to soften. It has been found that some of the polymer fibers melt, forming droplets or other particles which attach themselves to some of the mineral fibers. Others of the polymer fibers retain their fibrous shape, resulting in the presence of polymer fibers in the mineral fiber pack 32. The reason that some of polymeric material retains its fibrous shape, while other portions of the material form polymeric particles which attach themselves to the mineral fibers is not known. It may be that some of the polymer fibers do not soften to the extent required to cause them to lose their fibrous shape and turn into a more spherical shape. Alternatively, it may be that although all polymer fibers are softened, only a portion of them come into contact with mineral fibers while in a softened condition.

In order to make sure that the polymeric material does not experience a temperature exceeding the degradation or oxidation limit, a cooling means, such as water distributor 35 can be used to control the temperature regime which is experienced by the polymer fibers or polymeric material. The water distributor can be any suitable means for supplying finely divided moisture into the vicinity of the traveling polymer material. Another example of a cooling means is an air flow device, not shown, which directs air toward the polymer particles or fibers to control temperature at the point where the polymeric material meets the mineral fibers.

After the intermingled polymeric material and mineral fibers are collected to form a pack, optionally the pack can be passed through oven 34 to reset the form of the mineral fiber pack in order to produce mineral fiber product 36.

Figure 2:
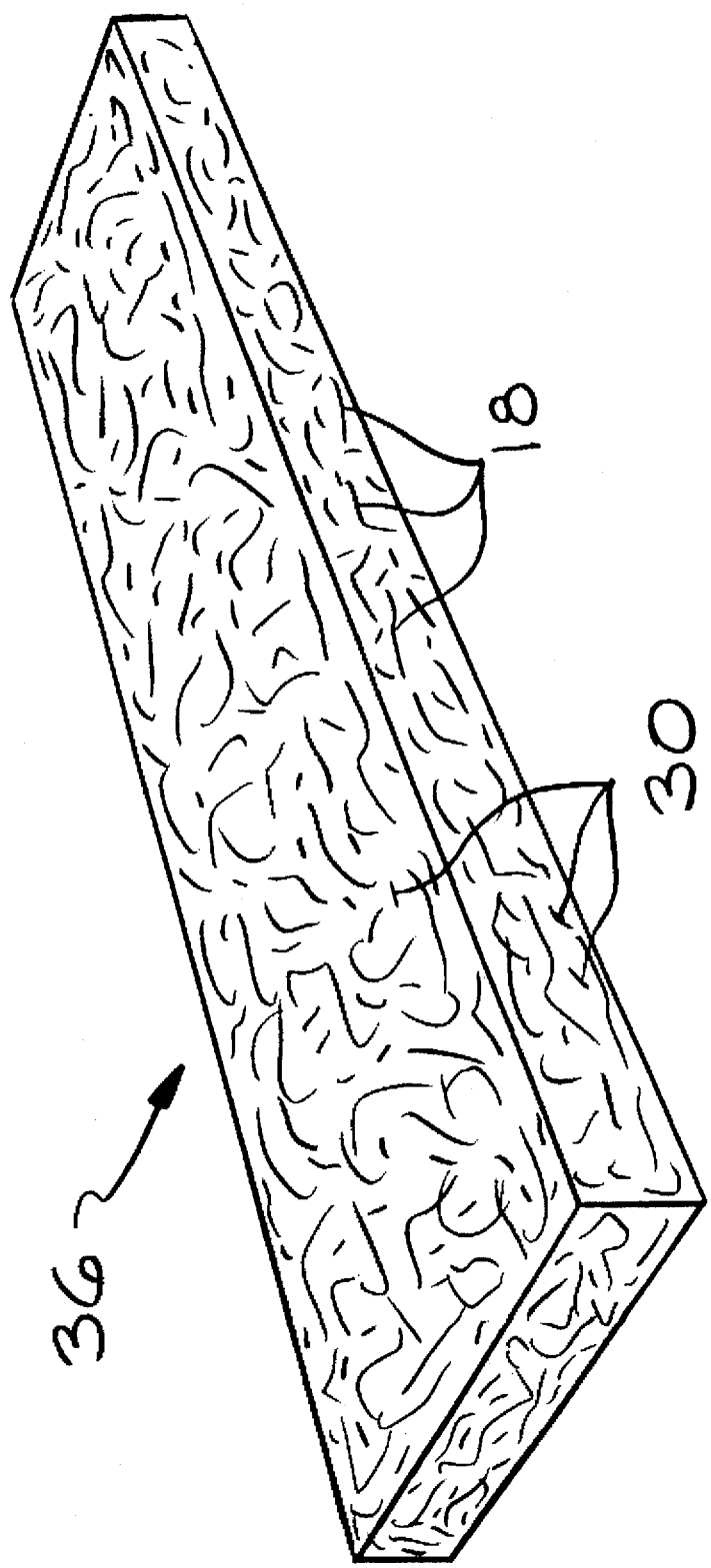
FIG. 2 is a mineral fiber product made by the process of the invention.

As shown in FIG. 2, the glass fiber product is comprised of mineral fibers 18 and polymer fibers 30. Some of the mineral fibers have particulate polymer material attached to them, and some of the mineral fibers may be completely coated with polymer material.

Although the invention shown in FIG. 1 used PET polymer material, it should be understood that other high molecular weight polymeric material can be used in this invention. Examples include polycarbonate material, polypropylene, polystyrene, and polysulfide.

It should also be understood that various amounts of polymeric material and mineral fiber material can be provided in the ultimate mineral fiber product. For example, typical building insulation has about 5% by weight of phenol/formaldehyde, and the insulation product resulting from this invention could have a similar weight ratio of polymeric material to the weight of the mineral fiber product. Insulation molding media products could have polymeric material within the range of from about 5 to about 40 percent, and preferably from about 10 to about 30% by weight of the mineral fiber product. Other mineral fiber products could include amounts of polymeric material exceeding 50% by weight of the mineral fiber product and possibly even exceeding 70 percent.

EXAMPLE

The method of the invention was employed to make a PET/glass fiber product. The glass fiber spinner had 50,000 orifices and was operated at a throughput of approximately 1,100 lbs. per hour. The PET material was supplied to a polymer spinner mounted for rotation beneath the glass spinner. The polymer spinner had approximately 7,000 orifices, and a throughput of approximately 50 lbs. per hour. The PET material had a molecular weight in excess of 200,000. The spinners were maintained at different temperatures to successfully process the glass and the polymer material, respectively.

The resulting product was a uniform blend of glass and polymer fibers, with some of the polymeric material being attached to the glass fibers, and some of the polymeric material being retained as intermingled polymer fibers. The product from this trial was found to be more flexible and more resistant to breaking under deflection than traditional glass fiber wool molding media. When molded in a typical glass fiber wool molding media apparatus, the product of the invention gave superior results, primarily in terms of resistance to breaking under deflection. This benefit was evident when molded, both as produced, and when post-treated with a resin such as a phenol/formaldehyde. Prior to molding, the product also exhibited increased recovery characteristics over that of the standard phenol/formaldehyde products. Also, application of ultra-violet light to the product gave a clear indication that the PET/glass fiber product had a greater uniformity of binder distribution than exhibited in typical phenol/formaldehyde products.

It will be evident from the foregoing that various modifications can be made to this invention. Such, however, are considered as being within the scope of the invention.

INDUSTRIAL APPLICABILITY

This invention will be found useful in the production of mineral fiber products, such as glass fiber products, for such uses as thermal insulation and glass fiber structural products. High performance polymer fibers such as PPS can be substituted for the mineral fibers to make an all-polymer product.

We claim:

1. A mineral fiber product comprising fibers composed of a polymeric material intermingled with mineral fibers which have non-fibrous particles of said polymeric material attached thereto, where the product is a uniform blend of mineral and polymeric fibers, and where the mineral fiber product is made by the process comprising:
    a. forming mineral fibers from molten mineral material;
    b. establishing a stream of the mineral fibers;
    c. directing fibers of said polymeric material toward the stream of mineral fibers to cause intermingling of said polymeric material and the mineral fibers;
    d. applying heat from an annular burner to the polymeric fibers so that some of them become softened to the extent that they lose their fibrous form and become attached to the mineral fibers as polymeric, non-fibrous particles of said polymeric material, whereas some of the polymeric fibers retain their fibrous form; and,
    e. collecting the intermingled mineral fibers having non-fibrous particles of said polymeric material attached thereto and fibers of said polymeric material to form the mineral fiber product.

2. The mineral fiber product of claim 1 comprising about 5 to about 40 percent by weight of said polymeric material.

3. The mineral fiber product of claim 1 where the mineral fiber product is made by a process in which the stream of mineral fibers contains hot gases which soften a portion of the fibers of said polymeric material so that they lose their fibers form and become attached to the mineral fibers as polymeric, non-fibrous particles of said polymeric material.

4. The mineral fiber product of claim 1 where the mineral fiber product is made by a process where the fibers of said polymeric material are directed toward the stream of mineral fibers form a position within a-cylindrical veil of mineral fibers to cause intermingling of said polymeric material and the mineral fibers.

5. The mineral fiber product of claim 4 in which the molecular weight of said polymeric material is greater than 1,000.

6. The mineral fiber product of claim 1 in which the molecular weight of said polymeric material is greater than 10,000.

7. A mineral fiber product comprising fibers composed of a polymeric material intermingled with mineral fibers which have non-fibrous particles of said polymeric material attached thereto, where the product is a uniform blend of mineral and fibers, and where the mineral fiber product is made by the process comprising:
    a. centrifuging mineral fibers from molten mineral material;
    b. establishing a downwardly moving veil of the mineral fibers and hot gases;
    c. directing fibers of said polymeric material toward the stream of mineral fibers to cause intermingling of said polymeric material and the mineral fibers, wherein the directing step causes some of the fibers of said polymeric material to become softened, by heat from an annular burner, to the extent that they lose their fibrous form and become attached to the mineral fibers as non-fibrous particles of said polymeric material, whereas some of the fibers of said polymeric material retain their fibrous form; and,
    d. collecting the intermingled mineral fibers having said non-fibrous particles attached thereto and fibers of said polymeric material to form a mineral fiber product.

8. The mineral fiber product of claim 7 where the mineral fiber product is made by a process in which the stream of mineral fibers contains hot gases which soften a portion of the fibers of said polymeric material so that they lose their fibers form and become attached to the mineral fibers as polymeric, non-fibrous particles of said polymeric material.

9. The mineral fiber product of claim 7 where the mineral fiber product is made by a process where the fibers of said polymeric material are directed toward the stream of mineral fibers form a position within a cylindrical veil of mineral fibers to cause intermingling of said polymeric material and the mineral fibers.

10. The mineral fiber product of claim 7 in which the molecular weight of said polymeric material is greater than 1,000.

11. The mineral fiber product of claim 7 in which the molecular weight of said polymeric material is greater than 10,000.

12. The mineral fiber product of claim 7 comprising about 5 to about 40 percent by weight of said polymeric material.

* * * * *